United States Patent
Brown et al.

(10) Patent No.: US 7,543,006 B2
(45) Date of Patent: Jun. 2, 2009

(54) FLEXIBLE, EFFICIENT AND SCALABLE SAMPLING

(75) Inventors: Paul Geoffrey Brown, San Jose, CA (US); Peter Jay Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/469,231

(22) Filed: Aug. 31, 2006

(65) Prior Publication Data

US 2008/0059540 A1    Mar. 6, 2008

(51) Int. Cl.
*G06F 17/30* (2006.01)

(52) U.S. Cl. .............. 707/205; 707/101; 707/102; 707/103 R; 707/104.1; 707/201

(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,878,426 | A | 3/1999 | Plasek et al. |
| 6,012,064 | A | 1/2000 | Gibbons et al. |
| 6,049,861 | A | 4/2000 | Bird et al. |
| 6,542,886 | B1 | 4/2003 | Chaudhuri et al. |
| 6,564,221 | B1 | 5/2003 | Shatdal |
| 6,889,221 | B1 | 5/2005 | Luo et al. |
| 2002/0198863 | A1 | 12/2002 | Anjur et al. |
| 2003/0004944 | A1 | 1/2003 | Harper et al. |
| 2003/0004973 | A1 | 1/2003 | Harper et al. |
| 2004/0049492 | A1 | 3/2004 | Gibbons |
| 2006/0101048 | A1* | 5/2006 | Mazzagatti et al. ......... 707/101 |

OTHER PUBLICATIONS

Phillip Gibbons et al. "New Sampling-Based Summary Statistics for Improving Approximate Query Answers" International Conference on Management of Data, Proceedings of th 1998 ACM SIGMOD International Conference on Management of Data; 1998; pp. 331-342.

Jeffrey Vitter "Random Sampling with a Reservoir" ACM Transactions on Mathematical Software (TOMS), vol. 11, Issue ; Mar. 1985; pp. 37-57.

* cited by examiner

*Primary Examiner*—Isaac M Woo
(74) *Attorney, Agent, or Firm*—IP Authority, LLC; Ramraj Soundararajan

(57) ABSTRACT

A sampling infrastructure/scheme that supports flexible, efficient, scalable and uniform sampling is disclosed. A sample is maintained in a compact histogram form while the sample footprint stays below a specified upper bound. If, at any point, the sample footprint exceeds the upper bound, then the compact representation is abandoned, the sample purged to obtain a subsample. The histogram of the purged subsample is expanded to a bag of values while sampling remaining data values of the partitioned subset. The expanded purged subsample is converted to a histogram and uniform random samples are yielded. The sampling scheme retains the bounded footprint property and to a partial degree the compact representation of the Concise Sampling scheme, while ensuring statistical uniformity. Samples from at least two partitioned subsets are merged on demand to yield uniform merged samples of combined partitions wherein the merged samples also maintain the histogram representation and bounded footprint property.

7 Claims, 8 Drawing Sheets

```
// phase = 1, 2, or 3 (static variable initialized to 1)
// F is the maximum allowable sample footprint
//    (corresponding to a sample size of n_F data-element values)
// i is the index of the newly arrived data element
// u_i is the value of the newly arrived data element
// S is the sample of data elements (static, initialized to 0)
// S' is a temporary sample of data elements (static)
// q is the phase-2 sampling rate
// n is index of next element to insert into reservoir (static)
// expand(S) converts S from a set of
//    (value, count) pairs to a bag of values
// uniform() returns a uniform[0,1] random number
// skip(n,k) is the reservoir-sampling skip function 1   if phase = 1 then                    // insert u_i into sample
2       insertValue(u_i, S)
3       if footprint(S) = F then
4           repeat
5               S' ← purgeBernoulli(S, q)
6           until |S'| < n_F
7           phase ← 2
8           S ← expand(S')
9       exit
12  if phase = 2 then                    // execute Bernoulli step
13      if uniform() ≤ q then            // insert u_i into sample
14          S ← S ∪ {u_i}                // add u_i to bag of values
15      if |S| = n_F then
16          phase ← 3                    // switch to reservoir mode
17          n ← i + skip(i; n_F)
18      exit
19  if phase = 3 then                    // execute reservoir step
20      if i = n then                    // insert u_i into reservoir
21          removeRandomVictim(S)
22          S ← S ∪ {u_i}
23          n ← i + skip(i; n_F)
24      exit
```

Figure 4

```
// S_1 and S_2 are the two input HB samples in compact form
// D_1 and D_2 are the parent partitions
// S is the combined sample
// F is the maximum allowable sample footprint
//    (corresponding to a sample size of n_F data-element values)
// h_i was the final phase of hybrid Bernoulli algorithm when creating S_i
// q_i is Bernoulli sampling rate when h_i = 2
// p is max. probability that Bernoulli sample exceeds n_F
//    which corresponds to n_F data-element values 1   if h_i = 1 for i = 1 or 2 then       // ≥ 1 sample is exhaustive
2       S ← S_{3−i}
3       apply hybrid Bernoulli algorithm to add values from S_i to S
4       exit
5   if h_i = 3 for i = 1 or 2 then       // ≥ 1 reservoir sample
6       combine S_1 and S_2 using function HRMerge
7       exit
8   if h_1 = h_2 = 2 then                // both Bernoulli samples
9       q ← q(|D_1| + |D_2|, p, n_F)
10      purgeBernoulli(S_1, q/q_1)
11      purgeBernoulli(S_2, q/q_2)
12      if footprint(join(S_1, S_2)) < F then
13          S ← join(S_1, S_2)
14      else                             // low-probability case
15          S ← purgeReservoir(S_1, n_F)
16          use reservoir sampling to add values in S_2 to S
17      exit
```

Figure 8

```
// S_1 and S_2 are the two input HR samples in compact form
// D_1 and D_2 are the parent partitions
// S is the combined sample
// F is the maximum allowed footprint of S,
//    which corresponds to n_F data-element values
// h_i was the final phase of hybrid reservoir algorithm when creating S_i
// computeProb computes hypergeometric probability distribution
// genVal(P) generates a random integer distributed according to P 1   if h_i = 1 for i = 1 or 2 then       // ≥ 1 sample is exhaustive
2       S ← S_{3−i}
3       apply hybrid reservoir algorithm to add values from S_i to S
4       exit
5   if h_1 = h_2 = 2 then                // both reservoir samples
6       k ← |S_1| ∧ |S_2|                // merged sample size
7       computeProb(P, |D_1|, |D_2|, |S_1|, |S_2|, k)
8       L = genProb(P)
9       purgeReservoir(S_1, L)
10      purgeReservoir(S_2, k − L)
11      S ← join(S_1, S_2)
12      exit
```

Figure 10

```
// this function purges a sample S by taking a Bern(q) subsample
// S is stored in compact form as (count, value) pairs
// binomial(n, p) returns a binomial random number 1   for (v, n) ∈ S
2       n ← binomial(n, q)         // take Bernoulli subsample
3       if n = 0 then S ← S − {(v, n)}
```

Figure 5

```
// this function purges a sample S
//    by taking a reservoir subsample of size M
// S is stored in compact form as (count, value) pairs
// Assume that elements of S are accessed sequentially
//    as (v_1, n_1), (v_2, n_2), ..., (v_m, n_m)
// j is index of next value to be included in reservoir
// b is the current "upper bucket boundary"
// L is current number of values in the reservoir
// uniformInt(J) returns a random integer uniform in {1, 2, ..., J}
// skip(n, k) is the reservoir-sampling skip function 1   b = L = 0 and j = skip(0; M)
2   for i = 1 to m
3       b ← b + n_i
4       n_i ← 0
5       if j ≤ b then              // insert instance(s) of v_i
6           repeat
7               if L = M then      // reservoir is full
8                   v = uniformInt(M)   // choose a random victim
9                   l = γ such that ∑_{j=1}^{γ−1} n_j < v ≤ ∑_{j=1}^{γ} n_j
10                  n_l ← n_l − 1 and L ← L − 1
11              n_i ← n_i + 1 and L ← L + 1
12              j ← j + skip(j; M)
13          until j > b
```

Figure 6

```
// phase = 1 or 2 (static variable initialized to 1)
// F is the maximum allowable sample footprint
//    (corresponding to a sample size of $n_F$ data-element values)
// i is the index of the newly arrived data element
// $u_i$ is the value of the newly arrived data element
// S is the sample of data elements (static, initialized to ∅)
// n is index of next element to insert into reservoir (static variable)
// expand(S) converts S from a set of
//    (value, count) pairs to a bag of values 1   if phase = 1 then                    // insert $u_i$ into sample
2       insertValue($u_i$, S)
3       if footprint(S) = F then
4           phase ← 2                    // switch to reservoir mode
5           n ← i + skip(i, $n_F$)
6       exit
7   if phase = 2 then                    // execute reservoir step
8       if i = n then                    // insert $u_i$ into sample
9           if unexpanded(S) then
10              purgeReservoir(S, $n_F$) // get reservoir subsample
11              expand(S)
12          removeRandomVictim(S)
13          S ← S ∪ {$u_i$}              // add $u_i$ to bag of values
14          n ← i + skip(i, $n_F$)
15      exit
```

Figure 9

FLEXIBLE, EFFICIENT AND SCALABLE SAMPLING

BACKGROUND OF THE INVENTION

1. Field of Invention

The present invention relates generally to the field of sampling. More specifically, the present invention is related to systems and methods to create uniform samples.

2. Discussion of Prior Art

Random sampling has been recognized as an invaluable tool for efficiently analyzing large data sets. A uniform random sample of values can be used for deriving quick approximate answers to analytical queries, for auditing data, and for exploring data interactively, in a setting of large-scale data repositories and warehouses. A uniform random sample from an input population is a subset of population elements, chosen in such a way that the chance of any of the possible samples of the same size being chosen is equal. Sampling has also received attention as a useful tool for data integration tasks such as automated metadata discovery.

One approach to exploit random sampling is to sample data on an as-needed adhoc basis. This approach can work well within a single database management system, but can be difficult to implement in more complex warehousing and information integration contexts. FIG. 1 describes a prior art system to perform sampling in a warehousing scenario. Full-scale data warehouse 102 stores a large amount of data which is sampled as a whole by a sampler 104. Sampler 104 runs a sampling algorithm to sample the data. The sampled data is then stored in a sample data warehouse 106. This sampling architecture does not support scalable and flexible sampling. Sampler 104 samples all the data in the full-scale data warehouse in response to any queries for a portion of that data. For example, in case data stored for the month of January is desired, all the data stored in the full-scale warehouse is sampled to extract a portion of the data corresponding to the month of January. Thus, a flexible and scalable sampling infrastructure is desired.

A sampling scheme may be defined by probability mass function P (.;D) on subsets of a population D={1, 2, ..., |D|} of distinct data elements. For a subset $\subseteq$ D, the quantity P(S; D) is the probability that the sampling scheme, when applied to D, produces the sample S. A sampling scheme is uniform if, for any population D, the associated probability function P satisfies P(S; D)=P(S'; D) whenever S, S' $\subseteq$ D with |S|=|S'|. All samples of equal size are equally likely.

Bernoulli sampling, simple random sampling (reservoir sampling), and concise sampling are examples of some sampling schemes known in the art. A bernoulli sampling scheme Bern(q) with sampling rate q∈[0, 1] includes each population data element in the sample with probability q and excludes the element with probability 1−q, independently of the other data elements. The associated probability function P is given by P(S;D)=$q^{|S|}(1-q)^{|D|-|S|}$ (wherein D is an input population and S is a sample), so that bernoulli sampling is uniform. An advantage of bernoulli sampling is that collecting samples is simple and computationally inexpensive and merging bernoulli samples is a relatively straightforward process. A disadvantage of bernoulli sampling is that the size of the sample is random, and hence cannot be controlled. The size of a Bern(q) sample from a population of size N is binomially distributed with parameters N and q, so that the standard deviation of the sample size is $\sqrt{Nq(1-q)}$. Hence the variability of the sample size grows without bound as the population size increases. Not knowing the size of the population makes the selection of an appropriate sampling rate difficult. Too small a sample rate in anticipation of a large population may yield an unacceptably small sample if the population is smaller than expected. Conversely, too large a sample rate may result in a sample that exceeds memory bound targets.

Simple random sampling (without replacement) with sample size k≧1 is defined as the unique uniform sampling scheme that produces a sample of the specified size:

$$P(S; D) = \begin{cases} 1/\binom{|D|}{k} & \text{if } |S| = k; \\ 0 & \text{otherwise.} \end{cases}$$

Reservoir sampling is an algorithm for obtaining a simple random sample based on a single sequential scan of data. The idea behind reservoir sampling is to maintain the invariant that the current reservoir constitutes a simple random sample of all data elements seen so far. Thus, the first k scanned data elements are inserted into the reservoir, so that the invariant property holds trivially. When the $n^{th}$ data element is scanned (n>k), this element is included in the sample with probability k/n, replacing a randomly and uniformly selected victim, and not included in the sample with probability 1−(k/n). Article entitled, "Random sampling with a reservoir", by Vitter describes generating random skips between successive inclusions using acceptance-rejection techniques to speed up the basic reservoir algorithm. An advantage of reservoir sampling is that the sample footprint is bounded a priori. A disadvantage of reservoir sampling algorithm is its inability to merge reservoir samples. The terms "reservoir sample" and "simple random sample" are used interchangeably throughout the application.

Concise sampling as described in article titled, "New sampling-based summary statistics for improving approximate query answers" by Gibbons et al., provides a sampling method having both an a priori bounded footprint and unlike basic bernoulli and reservoir sampling, a compact representation of a sample. A sample is stored in a compact, bounded histogram representation, i.e., as a set of pairs ($v_i$, $n_i$) whose footprint does not exceed F bytes, where $v_i$ is the ith distinct data element value in the sample and $n_i$ is the number of data elements in the sample that have value $v_i$. An advantage of concise sampling is that if the parent population contains few enough distinct values so that the sample footprint never exceeds F during processing, then the concise sample contains complete statistical information about the entire population in the form of an exact histogram. However, a disadvantage of concise sampling is that the samples produced are not uniform. Because concise sampling is biased toward samples with fewer distinct values, data-element values that appear infrequently in the population will be underrepresented in a sample.

A common drawback of the prior art sampling schemes is that the samples created using these schemes do not have all these properties: compact (pack a complete distribution into sample's memory if possible), uniform, bounded footprint (upper bound on memory usage), and flexibility in combining/merging.

The following references provide for a general teaching of random sampling schemes in database systems, however, none of these references teach the creation of uniform samples which are compact, have a bounded footprint, and can be flexibly combined/merged.

U.S. patent assigned to Lucent Technologies Inc., (U.S. Pat. No. 6,012,064) discusses the maintenance of a single random sample of 'set of tuples' in a relation, such that the sample is kept up-to-date in the presence of updates to the relation. However, warehousing multiple samples and merging such samples is not disclosed. Also, maintaining concise storage during sampling is not discussed.

U.S. patent assigned to NCR Corporation, (U.S. Pat. No. 6,564,221 B1) proposes the use of stratified sampling to sample a database in parallel, however, does not discuss warehousing (i.e. merging) issues. Also, maintaining concise storage during sampling is not discussed.

U.S. patent assigned to NCR Corporation, (U.S. Pat. No. 6,889,221 B1) proposes a specific mechanism for parallel sampling, involving careful management of seeds for pseudorandom number generators. Again, warehousing multiple samples and merging such samples is not disclosed. Also, maintaining concise storage during sampling is not discussed.

Whatever the precise merits, features, and advantages of the above cited references, none of them achieves or fulfills the purposes of the present invention.

SUMMARY OF THE INVENTION

A sampling system to maintain a warehouse of uniform random samples, the system comprising: a partitioning module to divide values in a data set into a plurality of mutually disjoint partitioned subsets; a plurality of sampling modules, each of the sampling modules sampling one of the partitioned subsets in an independent and parallel manner to output uniform random samples; a sample data warehouse to store uniform random samples output from each of the sampling modules; and wherein the independent and parallel sampling allows the sampling system to provide flexible and scalable sampling of the data set.

In an extended embodiment, the sampling system further comprises of a merging module to pairwise merge at least two uniform random samples of at least two partitioned subsets stored in the sample data warehouse to yield a compact and uniform merged sample of combined population of the partitioned subsets.

A computer-based method to sample partitioned subsets of a data set in a parallel manner to create compact and uniform random samples, the method comprising steps of: i) adding each arriving data value from a partitioned subset to a sample represented as a histogram; and ii) if a memory bound is exceeded, then, purging the sample to obtain a purged subsample, expanding a histogram representation of the purged subsample to a bag of values while sampling remaining data values of the partitioned subset; and yielding a compact and uniform random sample of the partitioned subset by converting the expanded subsample representation into a histogram representation upon receiving a last data value; else, yielding a compact and complete frequency distribution sample of the partitioned subset upon receiving a last data value.

In an extended embodiment, the method further comprises a step of pairwise merging at least two samples of partitioned subsets to create a compact and uniform merged sample of combined population of the partitioned subsets.

An article of manufacture comprising a computer usable medium having computer readable program code embodied therein to sample partitioned subsets of a data set in a parallel manner to create compact and uniform random samples, the medium comprising:

i) computer readable program code adding each arriving data value from a partitioned subset to a sample represented as a histogram; ii) computer readable program code checking if a memory bound is exceeded, then, purging the sample to obtain a purged subsample, expanding a histogram representation of the purged subsample to a bag of values while sampling remaining data values of the partitioned subset; and generating a compact and uniform random sample of the partitioned subset by converting the expanded subsample representation into a histogram representation upon receiving a last data value; else, generating a compact and complete frequency distribution sample of the partitioned subset upon receiving a last data value.

BRIEF DESCRIPTION OF THE DRAWINGS

FIG. 4 illustrates an algorithm for the hybrid bernoulli scheme, as per the present invention.

FIG. 5 illustrates a purgeBernoulli function.

FIG. 6 illustrates a purgeReservoir function.

FIG. 8 illustrates a function HBMerge that merges samples $S_1$ and $S_2$ generated by the hybrid bernoulli algorithm, as per the present invention.

FIG. 9 illustrates an algorithm for the hybrid reservoir scheme, as per the present invention.

FIG. 10 illustrates a function HRMerge that merges two samples $S_1$ and $S_2$ generated by the hybrid reservoir algorithm, as per the present invention.

DESCRIPTION OF THE PREFERRED EMBODIMENTS

Figure 1:
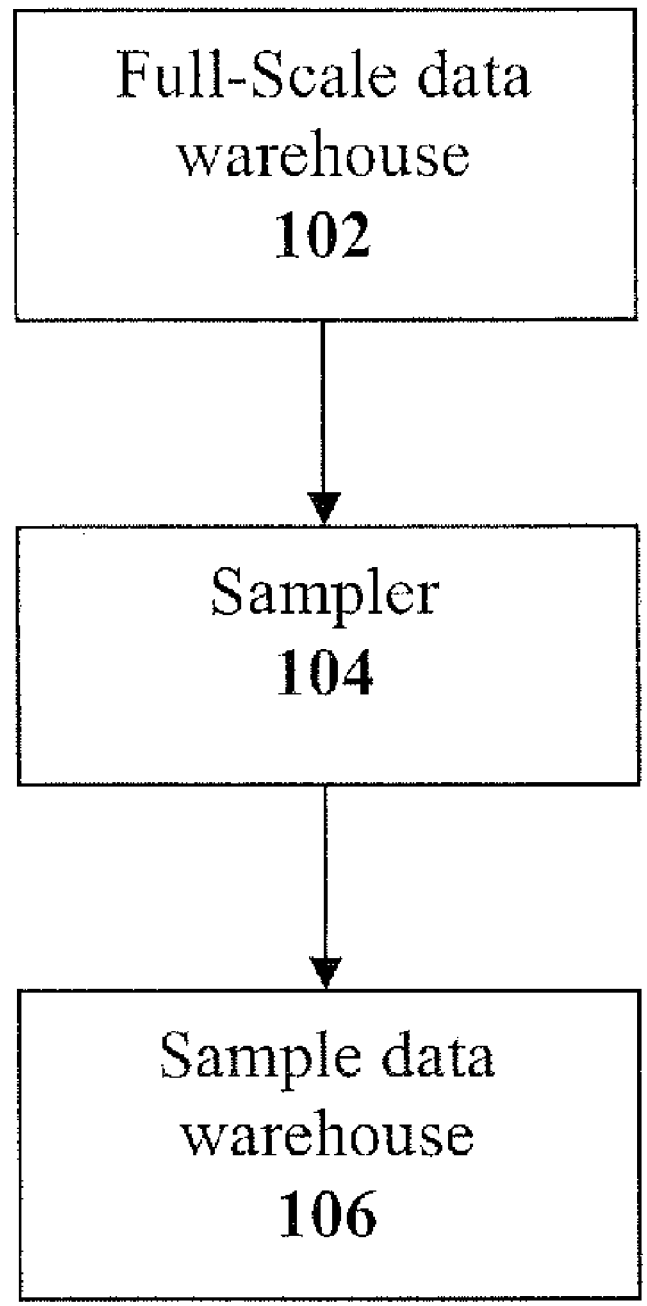
FIG. 1 illustrates a prior art sampling system.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

A full-scale warehouse consists of many data sets (bags of values) of an input population that can vary in size from a few hundred to hundreds of millions of values. The values that constitute a data set arrive in two ways: bundled into large batched collection, or as a streamed sequence of singleton values. Each data set is partitioned into mutually disjoint subsets. A sampling infrastructure can support flexibility and scalability goals by:

i) independent sampling of partitions of the data set (for example, partitions created either by dividing the batch or splitting the streams, and then further dividing the data based on timestamps)

ii) pairwise merging per-partition samples to create a single sample of data values in a user specified group of partitions, wherein the group may comprise all vales in the data set For example, in data warehousing, an initial batch of data from an operational system would be bulk loaded, followed up periodically by smaller sets of data reflecting additions to the operational system over time (as well as periodic deletions). Ingestion time can be minimized by sampling the initial batch in a parallel manner, and then merging samples acquired from the update stream so as to maintain a sample of the total data set. The bulk-load component of the data set might also be small but the ongoing data stream overwhelming for a single computer. In this case, the incoming stream is split over a number of machines and sample from the concurrent sampling processes merged on demand. In either scenario, the incoming data stream may also be partitioned further temporally, e.g., one partition per day, and then daily samples may be combined to form weekly, monthly, or yearly samples as needed for the purpose of analysis, auditing, or exploration.

Generally, samples are used for at least the following purposes:
  i) to compare a distribution of values in data sets as a means of determining how alike they are, and using this measure of similarity to construct a graph of associations between data sets
  ii) to inform approximate answers to queries over original data set(s)

Figure 2:
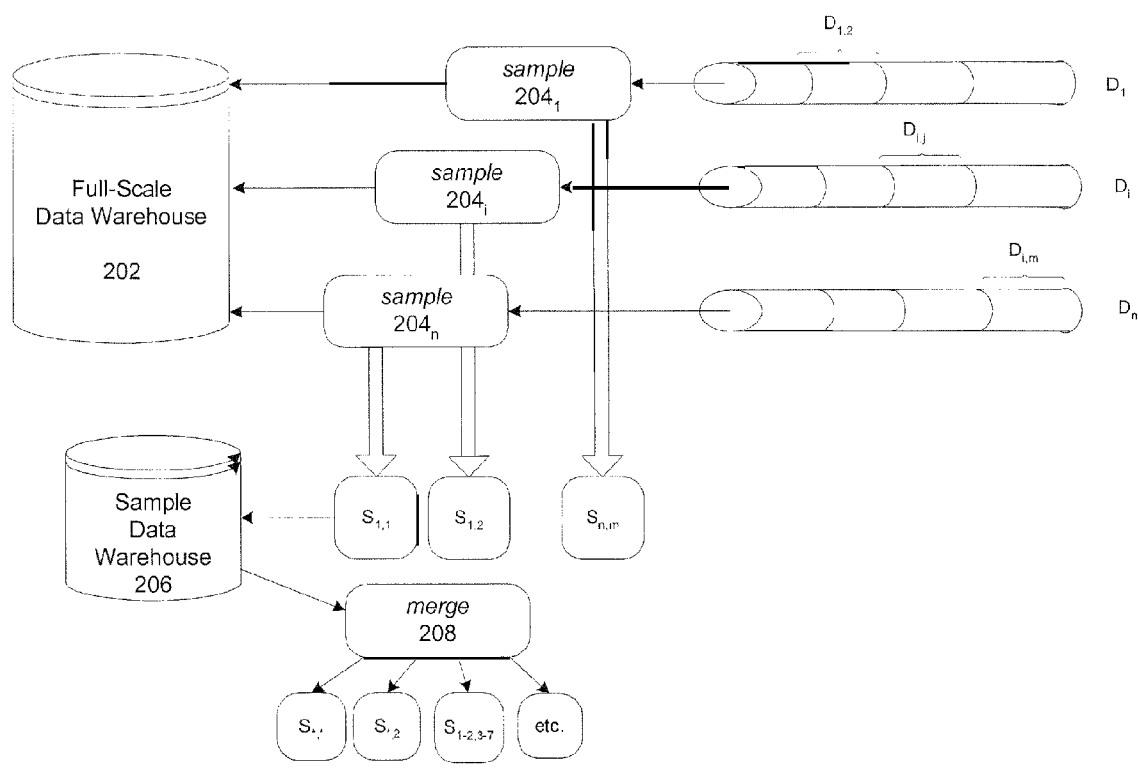
FIG. 2 illustrates a sampling system, as per the present invention.

FIG. 2 shows a sampling system that supports scalability and flexibility goals, as per an exemplary embodiment of the present invention. Data set D stored in a full-scale data warehouse 202 is parallelized across multiple CPU's as $D_1, D_2, \ldots, D_i, \ldots, D_n$ (i.e. partitioned into mutually disjoint subsets). Batches are usually of some finite size while streams are continuous. Thus, sampling of a single partition of a bulk loaded data set can terminate when all values in the partition have been examined. A stream, by contrast, might never terminate. Hence, for sampling streams, partitions $D_1, D_2, \ldots,$ are further divided/partitioned into temporal blocks $D_{i,1}, D_{i,2}, \ldots,$ (i.e., dividing incoming stream into blocks according to some time based schedule—day, hour, minutes etc.).

Values from each data set partition are passed to independent instances of sample modules $204_1, 204_i, \ldots, 204_n$ (producing uniform samples) and when a sufficiently large number of data values have been examined at a specified interval, a sample $S_{i,j}$ is produced for each data set partition $D_{i,j}$. The uniform samples are stored in sample data warehouse 206 and the uniform samples from a user specified group of partitions may then be merged by merging module 208 to yield a uniform random sample of the union of the partitions. Thus, sample data warehouse 206 maintains a warehouse of sampled data that shadows the full-scale data warehouse 202.

The merge operation takes two input samples—sample$_a$ and sample$_b$—and produces another sample, sample$_c$, which is a uniform sample of the data values in the partition(s) used to construct sample$_a$ and sample$_b$. Samples can also be combined to arrive at sample$_t$ which reflects the values in the (streaming) data set over a temporal window t, or even to arrive at sample$_{ds}$ which represents the nature of data set in all of its partitions, and all its time windows. Thus, by deriving samples from a set of input values and merging the derived samples, the sampling system achieves its scalability and flexibility goals. Also, partitions can be created, sampled and merged on-demand. For instance, if certain data stored for the month of January is desired, all the data stored in the full-scale warehouse need not be sampled as a whole. Since the data can be partitioned on a monthly basis, only a data partition related to month of January needs to be sampled to provide the desired results. Furthermore, if data is desired spanning a couple of months (say, January-March), the samples obtained from each of the partitions for these months can also be merged to provide such data.

This sampling system, in one embodiment is implemented in one of the following systems: a database management system, streaming or messaging system, a meta-data extraction product or ETL (extract, transform, and load) product.

The sampling system supports at least the following functionalities/goals:
  i) uniform random sampling
  ii) scalable, flexible, robust sampling: the sample/merge functionality described in FIG. 1 allows the system to deal flexibly with heterogeneous data sources and data-arrival patterns, and to handle large amounts of data quickly by exploiting parallelism
  iii) bounded footprint: storage required during and after sample creation is bounded a priori
  iv) compact samples: each sample partition is stored in a compact manner, which may be a (value, count) format that stores duplicate values. Also, compression techniques may be utilized to further minimize storage requirements Examples of some operations that are implemented by a sampling infrastructure of the present invention are:
1) Given a number of bags of data values B:

$$\text{sample}(B_i) \rightarrow S_i$$

sample takes as input a bag of data values—from some partition of a data set—and computes a uniform random sample of the values in the input bag. The assumption is that the function has a fixed amount of memory to work with, that maximizing the sample size is an important goal, and that this function needs to scale as |B| increases.

2) Given two samples $S_i$ and $S_j$:

$$\text{merge}(S_i, S_j) \rightarrow S_k$$

merge takes two samples $S_i$ and $S_j$—derived either from two partitions $B_i$ and $B_j$, or else from previous merge operation—and computes as its result another sample, $S_k$, which is a uniform random sample of combined population of the partitions.

3) Purging samples:

$$\text{purge}(S_i) \rightarrow S_p$$

purging a sample means removing sample elements to reduce sample size, while preserving the statistical uniformity property.

4) Expanding Samples:

$$\text{expand}(S_i^*) \rightarrow S_i$$

expanding a sample means converting a sample from compact histogram form, that is, from a collection of (value, frequency) pairs, to an equivalent representation of a bag of values. For example, if S={(a, 2), b, (c, 3)}, then expand(S) ={a, a, b, c, c, c}. (If the frequency of a value equals 1, then the frequency is suppressed in the histogram representation)

Figure 3:
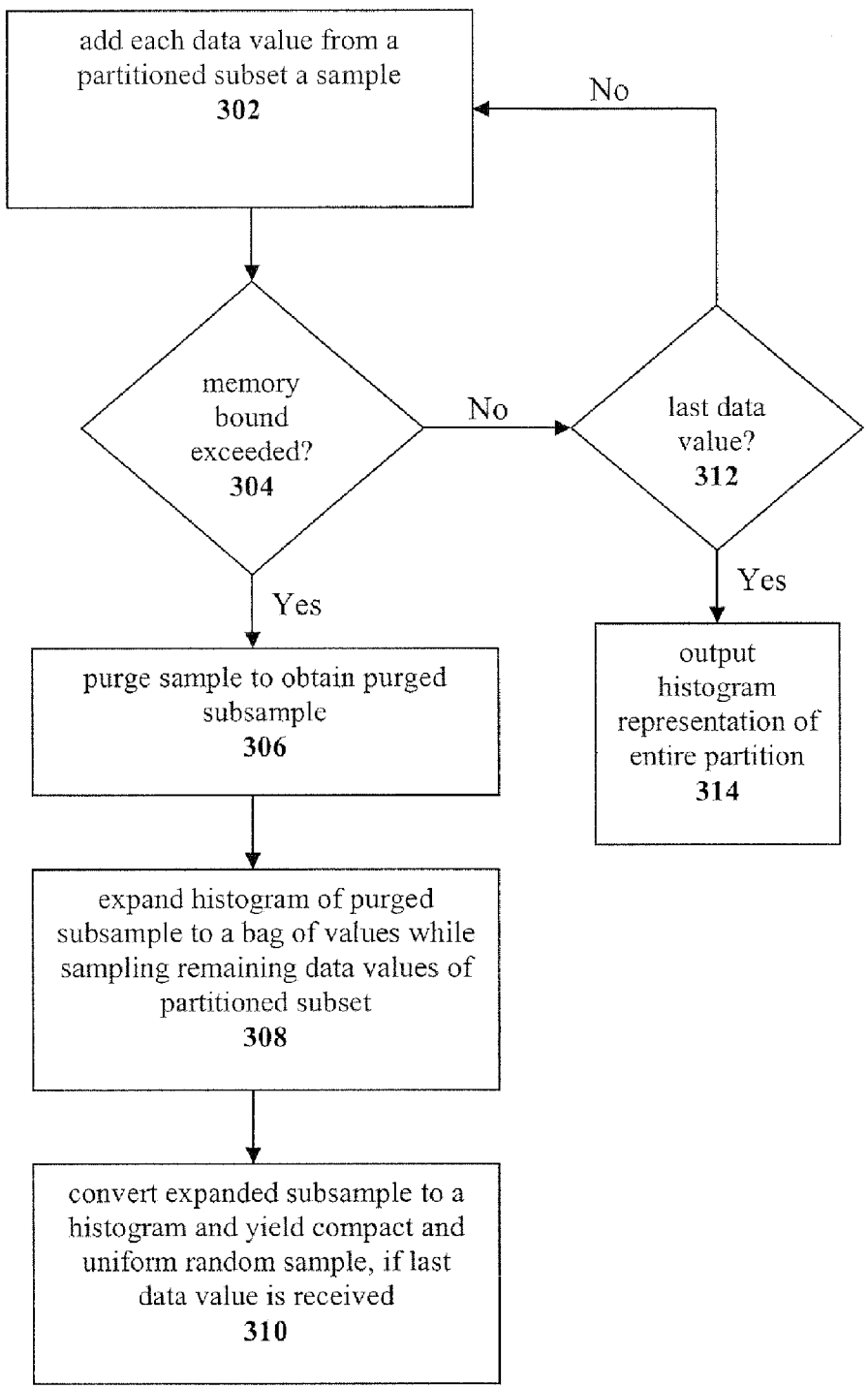
FIG. 3 illustrates a flowchart for the sampling scheme, as per the present invention.

FIG. 3 shows a flowchart for a preferred embodiment of the sampling scheme of the present invention. Each data value from a partitioned subset of a data set is added/inserted into a sample represented as a histogram (step 302). If there is insufficient memory (step 304) to store the entire histogram (i.e., sample footprint exceeds an upper bound), sample size is reduced by purging the sample to obtain purged subsample such that it would fit within the memory bound (step 306). The histogram representation of the purged subsample is expanded to a bag of values in step 308 while sampling the remaining data values of the partitioned subset. The remaining data values are sampled by any of, or a combination of the sampling schemes: bernoulli and reservoir sampling. After the last data value is received, the expanded subsample representation is converted back to a histogram (step 310) and a compact and uniform random sample is yielded. This scheme retains the bounded footprint property and to a partial degree the compact representation of the concise sampling scheme, while ensuring statistical uniformity. Samples created from various partitions of data set D may then be merged on demand to yield merged samples that maintain these properties. If the there is sufficient memory to store the entire histogram (i.e., sample footprint does not exceed an upper bound) and if the last of the data values has been added (step 312), a compact and uniform sample (i.e., a complete 100% sample or complete frequency distribution of the partition represented as a histogram) is yielded (step 314).

To overcome the disadvantages of prior art bernoulli sampling schemes and to implement a sampling scheme which retains the bounded footprint property and to a partial degree the compact representation of the concise sampling scheme, while ensuring statistical uniformity, a hybrid bernoulli sampling scheme (hereafter HB scheme) is introduced, as an embodiment of the present invention sampling scheme. The hybrid bernoulli sampling scheme attempts to sample at rate q=1 and maintain the sample in a compact histogram form (as in concise sampling) until it is forced to abandon that representation. An initial sampling rate would be q=1, so that all incoming data values are included in a sample. If the sample footprint stays below a specified upper bound F during processing, then the sampling scheme returns an exact histogram representation of the parent data-set partition D. If the insertion of an arriving data element causes the sample footprint to exceed the upper bound F, then the compact representation is abandoned and the scheme switches over to ordinary Bern(q) sampling with q<1. The HB scheme assumes that the data set size is known, and selects q so that, with high probability, the sample size will never exceed $n_F$, where the sample-size bound of $n_F$ data element values corresponds to the maximum allowable footprint size of F bytes. In the unlikely event that the sample size exceeds $n_F$, the HB scheme switches to reservoir sampling with reservoir size of $n_F$. In this case, the sample is still uniform, but it is a simple random sample (without replacement) rather than a bernoulli sample.

Figure 7:
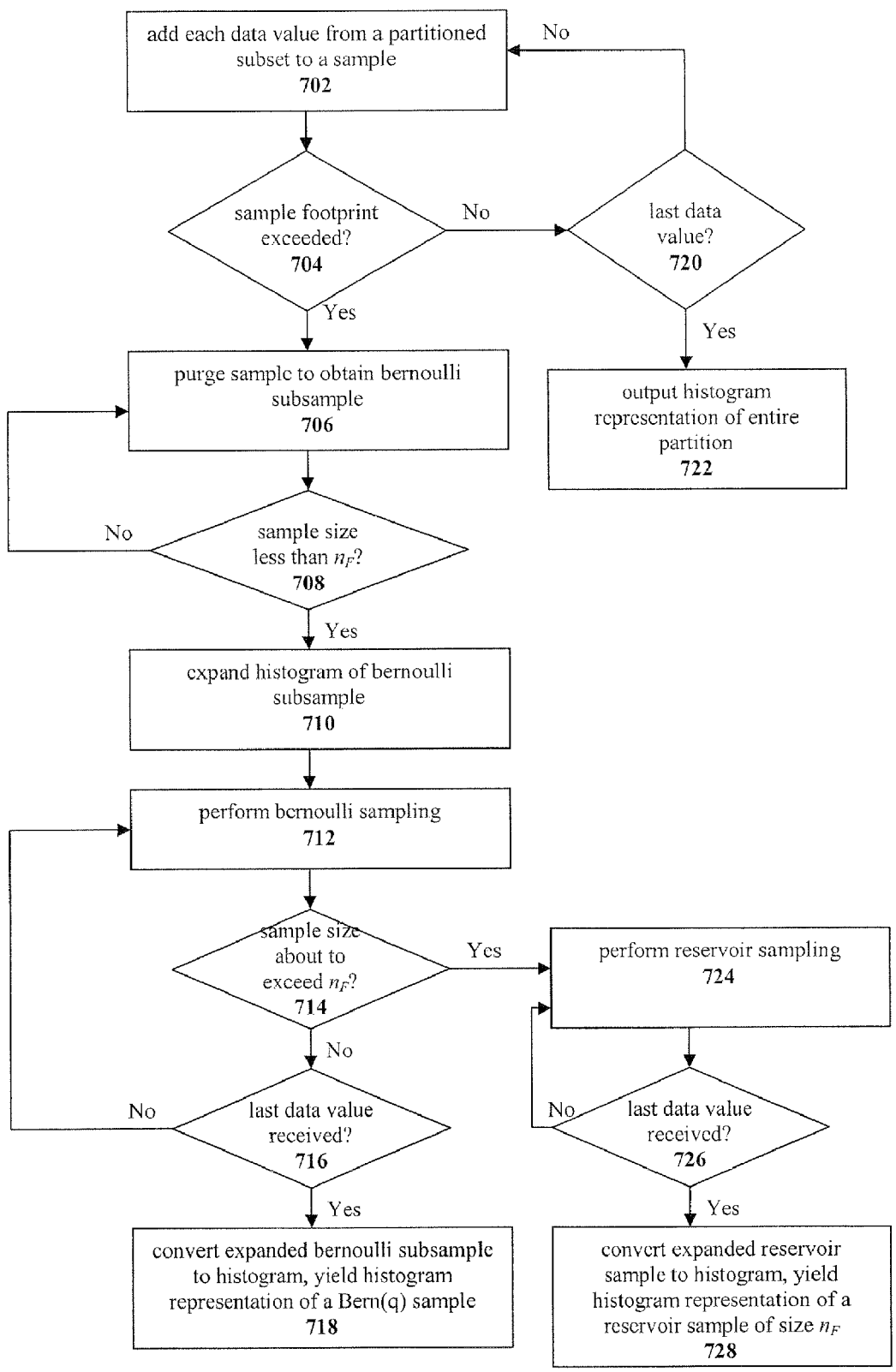
FIG. 7 illustrates a flowchart depicting steps for implementing a hybrid bernoulli scheme, as per the present invention.

FIG. 4 illustrates an algorithm for the HB scheme and FIG. 7 illustrates a flowchart depicting steps for implementing a HB scheme. This algorithm is executed for each data element upon arrival. In the 1$^{st}$ phase, the function insertValue is used to add the value $u_i$ of the arriving data element to the sample S (step 702), which is initially stored in compact histogram form. Specifically, if there is already a (value, frequency) pair (v,n)∈S with v=$u_i$, then insertValue updates the pair to (v,n+1), and if there is a singleton element v with v=$u_i$, then insertValue replaces v by pair (v, 2); otherwise, insertValue adds the singleton $u_i$ to S. As with concise sampling, the final "sample" will consist of the exact frequency histogram (i.e. complete frequency distribution) for the data set (step 722) if the footprint never exceeds the upper bound F (step 704) and the last data value is received (step 720). On the other hand, if the footprint exceeds F, then the HB algorithm attempts to switch to bernoulli sampling. If the footprint exceeds F (step 704), the algorithm invokes the purgeBernoulli function (as shown in FIG. 5), which takes a Bern(q) subsample S' by appropriately decrementing the second component of each (v,n) pair in S according the binomial distribution (step 706). If, as is highly likely, the resulting sample size is less than $n_F$ (step 708), then the algorithm enters phase 2 and switches over to bernoulli sampling; else, subsampling step 706 is repeated until the sample size is less than $n_F$. When the HB algorithm is in phase 2, it attempts to maintain a Bern(q) sample. At the time of the first bernoulli insertion into the sample after the algorithm enters phase 2, the algorithm invokes the function expand to convert the bernoulli subsample (initially stored in S') from compact histogram form to a bag of values (step 710). For the remainder of phase 2, arriving data elements are sampled according to a Bern(q) mechanism (step 712).

While sampling according to the Bern(q) mechanism, in the event that the resulting sample size is about to exceed $n_F$ (step 714), i.e., |S'|≧$n_F$, (in other words, if the sample size attains the upper bound $n_F$ during phase 2), then the HB algorithm enters phase 3, and any further arrivals are processed using the reservoir sampling algorithm (step 724). The reservoir sampling algorithm uses the function removeRandomVictim, which removes randomly and uniformly selected element from the bag of values.

In an alternative embodiment of the algorithm, the bernoulli sampling rate is decremented after each execution of step 706 using techniques known to those skilled in the art. In yet another embodiment, if the sample size is not less than $n_F$ in step 708, then the algorithm takes a reservoir subsample of size $n_F$ using the function purgeReservoir (as shown in FIG. 6), expands the histogram representation of the sample, and enters phase 3 directly, so that the algorithm switches over to reservoir sampling mode and any further arrivals are processed using the reservoir sampling algorithm as in step 724.

After the last data element has arrived (in steps 716 and 726), the sample is finalized by converting S, if necessary, back to compact histogram form (i.e., algorithm applies the inverse of the expand function). Thus, depending on whether the HB algorithm terminates in phase 1, 2, or 3, it produces either a histogram representation of entire partition D (i.e., complete frequency distribution sample) as in step 722, a histogram representation of a Bern(q) sample (step 718), or a histogram representation of a reservoir sample from D of size $n_F$ (step 728). The HB algorithm always produces a uniform sample.

The Bernoulli sampling rate q=q(N, p, $n_F$), where p is maximum allowable probability that |S|>$n_F$ and N is the population size. The sampling rate q is selected so that with high probability the number of data-element values in S will never exceed the upper bound $n_F$. In one embodiment, the sampling rate q(N, p, $n_F$) is computed by solving the equation f(q)=p, where $$f(q) = \sum_{j=n_F+1}^{N} \binom{N}{j} q^j (1-q)^{N-j}.$$

When N is large, $n_F$/N, is not small, and p<=0.5, q is approximated as:

$$q(N, p, n_F) \approx \frac{N(2n_F + z_p^2) - z_p\sqrt{N(Nz_p^2 + 4Nn_F - 4n_F^2)}}{2N(N + z_p^2)}, \quad \text{equation (1)}$$

where $z_p$ is the (1−p) quantile of the standard (mean 0, variance 1) normal distribution.

The function HBMerge, shown in FIG. 8, merges samples $S_1$ and $S_2$ generated by the HB algorithm from respectively disjoint data-set partitions $D_1$ and $D_2$. When at least one sample $S_i$ is exhaustive, i.e., represents an entire dataset partition (line 1), HBMerge simply initializes the running sample in Algorithm HB to equal $S_{3-i}$, sequentially extracts data-element values from $S_i$, and feeds the resulting stream of values to Algorithm HB. Note that no expansion of $S_i$ is required for such extraction. Algorithm HB is appropriately initialized to be in phase 1, 2, or 3, depending upon whether $S_{3-i}$ is an exhaustive, bernoulli, or reservoir sample.

When neither $S_1$ nor $S_2$ is exhaustive but at least one sample is a reservoir sample (line 5), then the other sample can always be viewed as a simple random sample. In this case, the HRMerge algorithm described subsequently is used to perform the merge. When both samples are bernoulli samples (line 8), HBMerge determines the sampling rate q such that a Bern(q) sample from $D1 \cup D2$ will, with high probability, not exceed the upper bound $n_F$. In lines 10 and 11, HBMerge takes bernoulli subsamples from $S_1$ and $S_2$ such that, after the subsampling, $S_i$ is a Bern(q) sample of $D_i$ for i=1, 2, and hence $S_1 \cup S_2$ is a Bern(q) sample of $D_1 \cup D_2$. Note that $q/q_i \approx |D_i|/(|D_1|+|D_2|)$ for i=1, 2. If the footprint of the combined samples does not exceed F, then the sample is merged using the join function. This function computes the compact histogram representation S of expand($S_1$) $\cup$ expand($S_2$) without actually performing the expansions. E.g., for each value v such that (v,n) belongs to the set $(S_1-S_2) \cup (S_2-S_1)$ for some n, join inserts the pair (v,n) into S, and for each value v such that $(v,n_1)$ belongs to the set $S_1$ and $(v,n_2)$ belongs to the set $S_2$ for some $n_1, n_2$, join inserts the pair $(v,n_1+n_2)$ into S. (Note that the if clause in line 12 may be evaluated without actually invoking join in its entirety.) In the unlikely case that the bernoulli sample $S_1 \cup S_2$ is too large, reservoir sampling is used (lines 15-16) to create a simple random sample of size $n_F$. Reservoir sampling using purgeReservoir is first applied to $S_1$. Then, an algorithm almost identical to purgeReservoir is used to stream in the values from $S_2$ (without requiring expansion of $S_2$). When processing $S_2$, the only difference from purgeReservoir is that when a pair (u, n) derived from $S_2$ is included in S, the $(v_i, n_i)$ pairs already in S must be scanned to see if there is some i for which $v_i=u$, so that the new pair (u, n) can be incorporated simply by setting $n_i \leftarrow n_i+n$.

To overcome the disadvantages of prior art reservoir sampling scheme and to implement a sampling scheme which retains the bounded footprint property and to a partial degree the compact representation of the concise sampling scheme, while ensuring statistical uniformity, a Hybrid Reservoir sampling scheme (hereafter HR scheme/algorithm) is introduced, as another embodiment of the present invention sampling scheme. The HR algorithm is similar to the HB algorithm in that it attempts to maintain a sample in compact histogram form until it is forced to abandon that representation. The HR algorithm either produces a complete histogram presentation of the parent data-set partition or a histogram representation of a reservoir sample of size at most $n_F$, where, $n_F$ is the maximum number of data element values that can fit into the maximum allowable sample footprint of F bytes. As with algorithm HB, algorithm HR is invoked upon arrival of each data element, and S is converted to compact histogram form after the last data element arrives.

Figure 11:
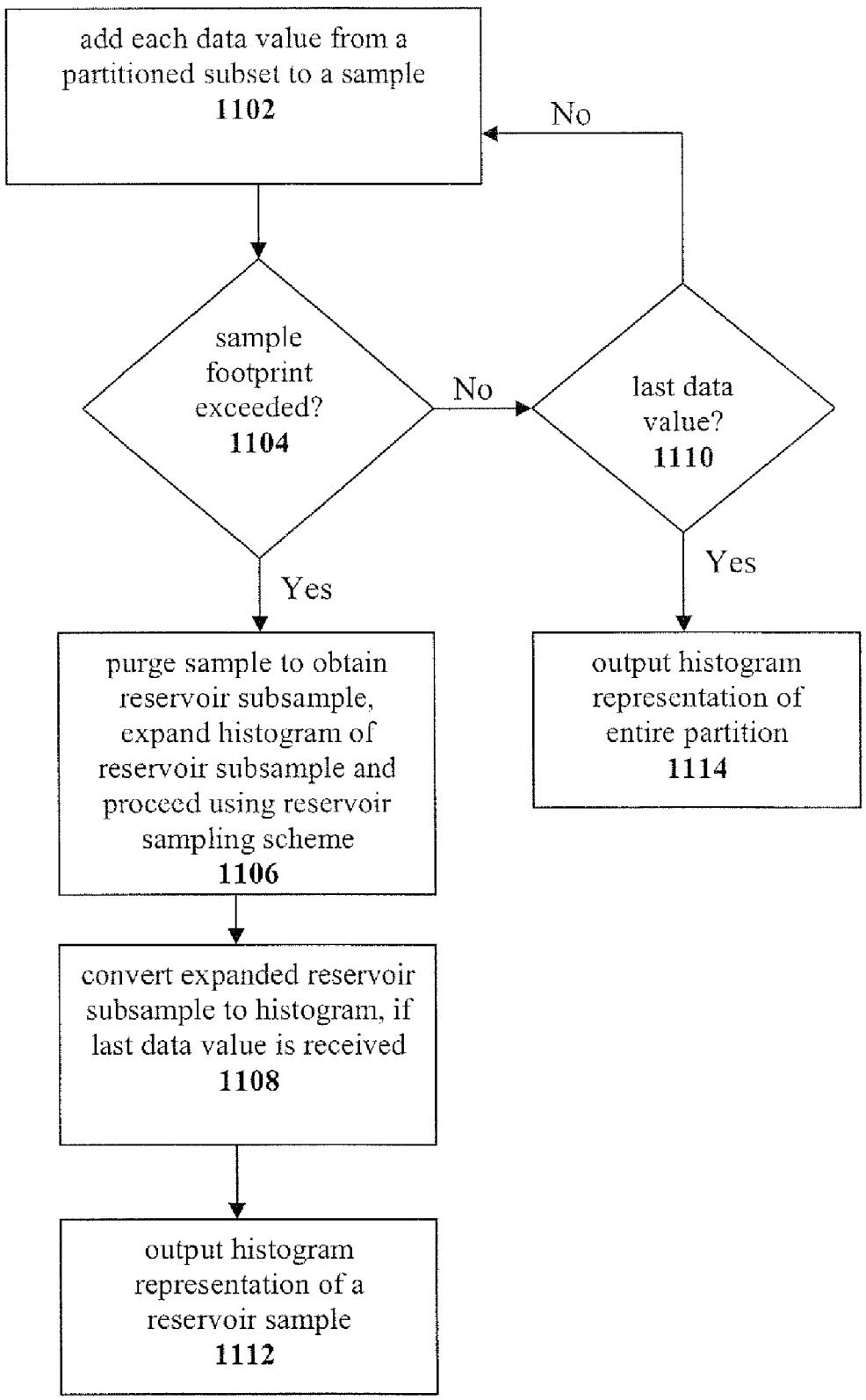
FIG. 11 illustrates a flowchart depicting steps for implementing the hybrid reservoir algorithm, as per the present invention.

FIG. 9 illustrates an algorithm for the HR scheme and FIG. 11 illustrates a flowchart depicting steps for implementing the HR algorithm. This algorithm is executed for each data element upon arrival. The function insertValue is used to add the value $u_i$ of the arriving data element to the sample S (step 1102), which is initially stored in compact histogram form. If the sample footprint exceeds F (step 1104), then the sample is purged to obtain a reservoir subsample, the histogram representation of the reservoir subsample is expanded to a bag of values and any further arrivals are processed using the reservoir sampling scheme (step 1106). The expanded reservoir subsample is converted back to a histogram (step 1108), if last data value is received. The HR algorithm, like the HB algorithm, upon processing the last data value received yields uniform samples which are either a histogram representation of entire partition D (i.e., a complete frequency distribution sample) as in step 1112 or a histogram representation of a reservoir sample (step 1114).

Function HRMerge is shown in FIG. 10. HRMerge merges two samples $S_1$ and $S_2$ generated by HR algorithm from respective disjoint partitions $D_1$ and $D_2$. When at least one sample is exhaustive (line 1), the algorithm proceeds similarly to function HBMerge. When both samples are true reservoir samples (line 5), HRMerge forms a merged simple random sample of size k=minimum ($|S_1|, |S_2|$) from $D_1 \cup D_2$ by selecting L values randomly and uniformly from $S_1$ and k-L values from $S_2$, where L is a random variable with probability mass function P(l)=P {L=l} given by $$P(l) = \frac{\binom{|D_1|}{l}\binom{|D_2|}{k-l}}{\binom{|D_1|+|D_2|}{k}}$$

for l=0, 1, ..., k. P is a hypergeometric probability distribution. The function computeProb calculates the probability vector P, and genProb generates a sample P. The join function is the same as in HBMerge.

Thus, the hybrid bernoulli (HB) and hybrid reservoir (HR) algorithms obtain and merge random samples that guarantee statistical uniformity while keeping the size of the sample compact, provide a guaranteed bound on the maximum storage required during and after sample processing, and preserve the possibility that a complete frequency distribution/histogram of the input partition (and even the entire input data set) is produced.

Additionally, the present invention provides for an article of manufacture comprising computer readable program code contained within implementing one or more modules to create and merge uniform random samples. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM. SDRAM, or any other appropriate static or dynamic memory or data storage devices.

Implemented in computer program code based products are software modules for:
  i) adding each arriving data value from a partitioned subset to a sample represented as a histogram;
  ii) checking if a memory bound is exceeded, then, purging the sample to obtain a purged subsample, expanding a histogram representation of the purged subsample to a bag of values while sampling remaining data values of the partitioned subset; and generating a compact and uniform random sample of the partitioned subset by converting the expanded subsample representation into a histogram representation upon receiving a last data value; else, generating a compact and complete frequency distribution of the partitioned subset upon receiving a last data value.

CONCLUSION

A system and method has been shown in the above embodiments for the effective implementation of a flexible, efficient and scalable sampling. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, compaction techniques to minimize storage requirements of samples, or specific computing hardware.

The invention claimed is:

1. A sampling system to maintain a warehouse of uniform random samples, said system comprising:
   a partitioning module to divide values in a data set into a plurality of mutually disjoint partitioned subsets;
   a plurality of sampling modules, each of said sampling modules sampling one of said partitioned subsets in an independent and parallel manner to output uniform random samples;
   a sample data warehouse to store uniform random samples output from each of said sampling modules; and
   wherein said independent and parallel sampling allows said sampling system to provide flexible and scalable sampling of said data set, and
   wherein at least one of said sampling modules: i) adds each arriving data value from a partitioned subset to a sample represented as a histogram, ii) if a memory bound is exceeded, then, purges said sample to obtain a purged subsample, expands a histogram representation of said purged subsample to a bag of values while sampling remaining data values of said partitioned subset; and yields a compact and uniform random sample of said partitioned subset by converting said expanded subsample representation into a histogram representation upon receiving a last data value; else, yields a compact and complete frequency distribution sample of said partitioned subset upon receiving a last data value.

2. A sampling system to maintain a warehouse of random samples, according to claim 1, wherein said data set is a batched collection or a streamed sequence of singleton values.

3. A sampling system to maintain a warehouse of random samples, according to claim 1, wherein each of said partitioned subsets are further partitioned into temporal blocks, said sampling modules sampling one of said temporal blocks in an independent and parallel manner.

4. A sampling system to maintain a warehouse of random samples, according to claim 1, wherein said sampling system further comprises a merging module to pairwise merge at least two uniform random samples of at least two said partitioned subsets stored in said sample data warehouse to yield a compact and uniform merged sample of combined population of said partitioned subsets.

5. A sampling system to maintain a warehouse of random samples, according to claim 1, wherein said data set is partitioned across multiple CPU's.

6. A sampling system to maintain a warehouse of random samples, according to claim 1, wherein at least one of said sampling modules implements a hybrid bernoulli sampling scheme and: i) adds each arriving data value from a partitioned subset to a sample represented as a histogram; ii) if a memory bound is not exceeded, then, (a) yields a compact and complete frequency distribution sample of said partitioned subset, else, (b) performs a first purging step on said sample to obtain a bernoulli subsample until sample size of said bernoulli subsample is less than a sample size bound; (c) expands a histogram representation of said purged bernoulli subsample to a bag of values; (d) samples data values arriving after said first purging step via bernoulli sampling scheme; (e) if sample size is about to exceed a sample size bound while sampling data values via bernoulli sampling scheme in step c, then, samples further arriving data values via a reservoir sampling scheme; and yields a compact and uniform reservoir sample of said partitioned subset by converting expanded reservoir sample into a histogram representation upon receiving a last data value; else, continues to sample arriving data values via said bernoulli sampling scheme; and yields a compact and uniform bernoulli sample of said partitioned subset by converting said expanded bernoulli subsample into a histogram representation upon receiving a last data value.

7. A sampling system to maintain a warehouse of random samples, according to claim 1, wherein said sampling module implements a hybrid reservoir sampling scheme and: i) adds each arriving data value from a partitioned subset to a sample represented as a histogram; and ii) if a memory bound is not exceeded, then, (a) yields a compact and complete frequency distribution sample of said partitioned subset upon receiving a last data value, else, (b) purges said sample to obtain a reservoir subsample; (c) expands a histogram representation of said reservoir subsample to a bag of values; (d) samples data values arriving after said purge via reservoir sampling scheme; (e) converts said expanded reservoir subsample from step (c) into a histogram representation upon receiving a last data value; and (f) yields compact and uniform reservoir subsample obtained from step (e).

* * * * *